(No Model.) 5 Sheets—Sheet 1.

S. S. BOGART.
ELECTRIC SELECTING DEVICE.

No. 507,205. Patented Oct. 24, 1893.

WITNESSES:
Edward O. Rowland

INVENTOR
Samuel S. Bogart
BY
Price Stuart
ATTORNEYS.

(No Model.) 5 Sheets—Sheet 2.

S. S. BOGART.
ELECTRIC SELECTING DEVICE.

No. 507,205. Patented Oct. 24, 1893.

WITNESSES:
Edward C. Rowland

INVENTOR
Samuel S. Bogart
BY
Price & Stewart
ATTORNEYS.

(No Model.) 5 Sheets—Sheet 3.

S. S. BOGART.
ELECTRIC SELECTING DEVICE.

No. 507,205. Patented Oct. 24, 1893.

WITNESSES:
Edward C. Rowland
D. J. Ritterband

INVENTOR
Samuel S. Bogart
BY
Price & Stewart
ATTORNEYS (No Model.) 5 Sheets—Sheet 4.
S. S. BOGART.
ELECTRIC SELECTING DEVICE.
No. 507,205. Patented Oct. 24, 1893.
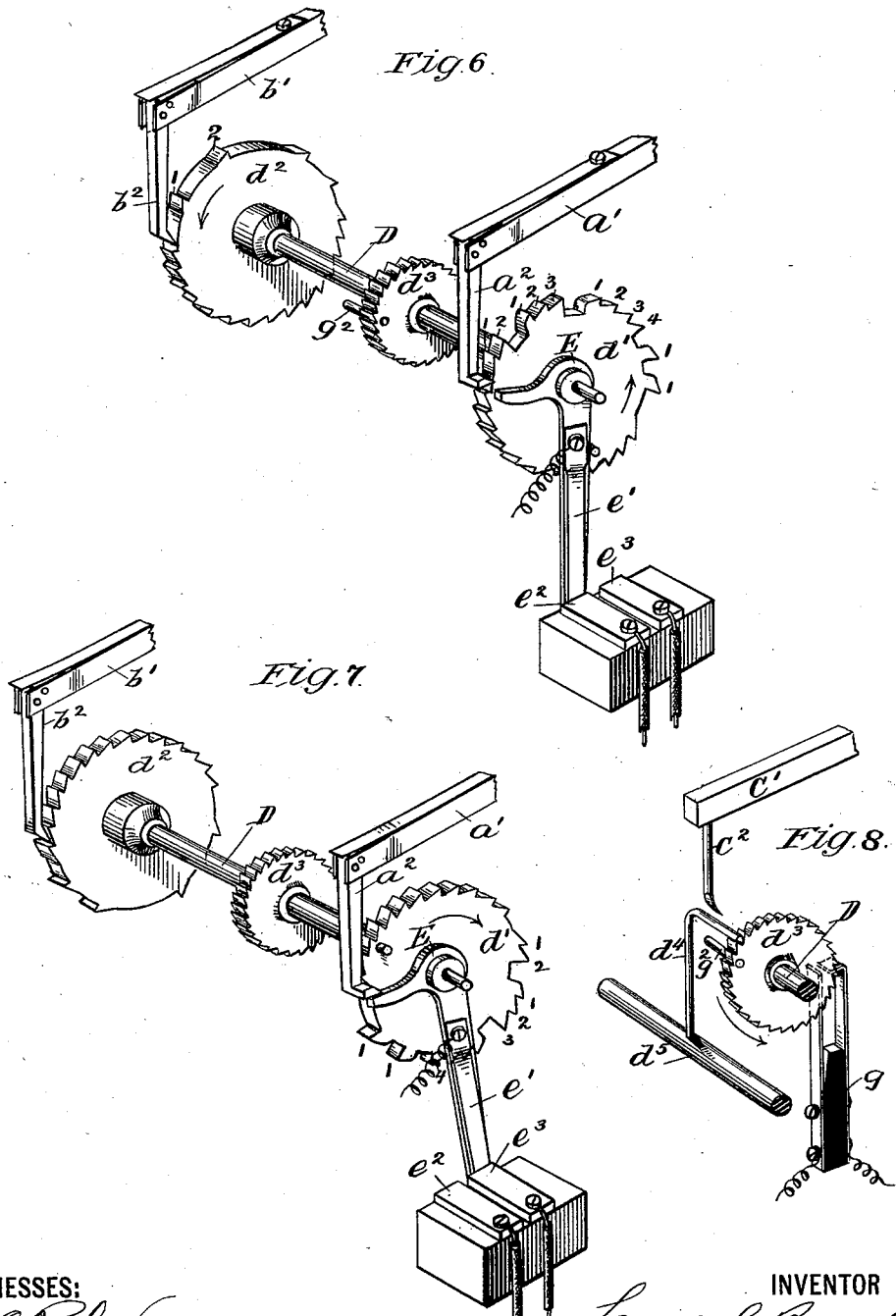
WITNESSES:
Edward C. Rowland.
D S Ritterband
INVENTOR
Samuel S. Bogart
BY
Price & Stewart
ATTORNEYS (No Model.) 5 Sheets—Sheet 5.

S. S. BOGART.
ELECTRIC SELECTING DEVICE.

No. 507,205. Patented Oct. 24, 1893.

WITNESSES:
Edward C. Rowland
D. T. Ritterband

INVENTOR
Samuel S. Bogart
BY
Price & Stuart
ATTORNEYS

UNITED STATES PATENT OFFICE.

SAMUEL S. BOGART, OF NEW YORK, N. Y., ASSIGNOR, BY MESNE ASSIGNMENTS, TO THE ELECTRIC SELECTOR AND SIGNAL COMPANY, OF WEST VIRGINIA.

ELECTRIC SELECTING DEVICE.

SPECIFICATION forming part of Letters Patent No. 507,205, dated October 24, 1893.

Application filed November 24, 1891. Serial No. 412,928. (No model.)

*To all whom it may concern:*

Be it known that I, SAMUEL S. BOGART, of the city, county, and State of New York, have invented certain new and useful Improvements in Electric Selecting Devices, of which the following is a full description.

My invention relates to that class of instruments wherein a transmitting device sends out a combination of fixed or predetermined electrical impulses to any selected one of a series of receiving instruments, each of which is constructed and adapted to respond to its own fixed combination and to no other, by means of certain movable mechanical representations of the electrical impulses controlled and worked out by the armature lever of an electro-magnet operated by the transmitted combination impulses, to impel the movable mechanical representations of the impulses to the end of its course or phase, operate a signal or other device, return an answer-back-message and restore the receiving instrument to its starting point. Such instruments are well described in the patents of Adin A. Hatch, No. 403,104, and Foote and Moore, No. 454,643, which are good representations of the class.

The accompanying drawings illustrate my invention of which—

Figure 1:
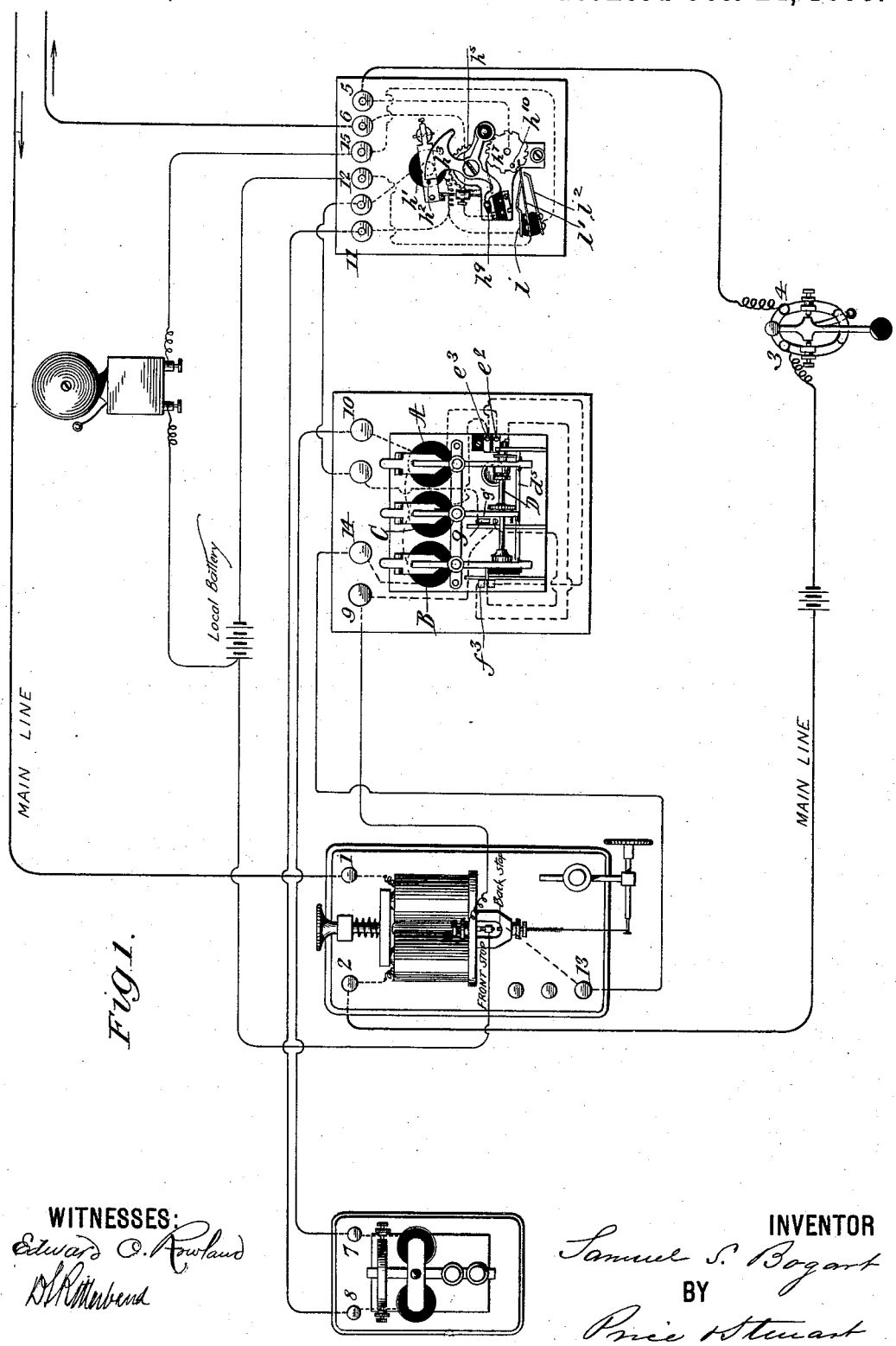
Figure 2:
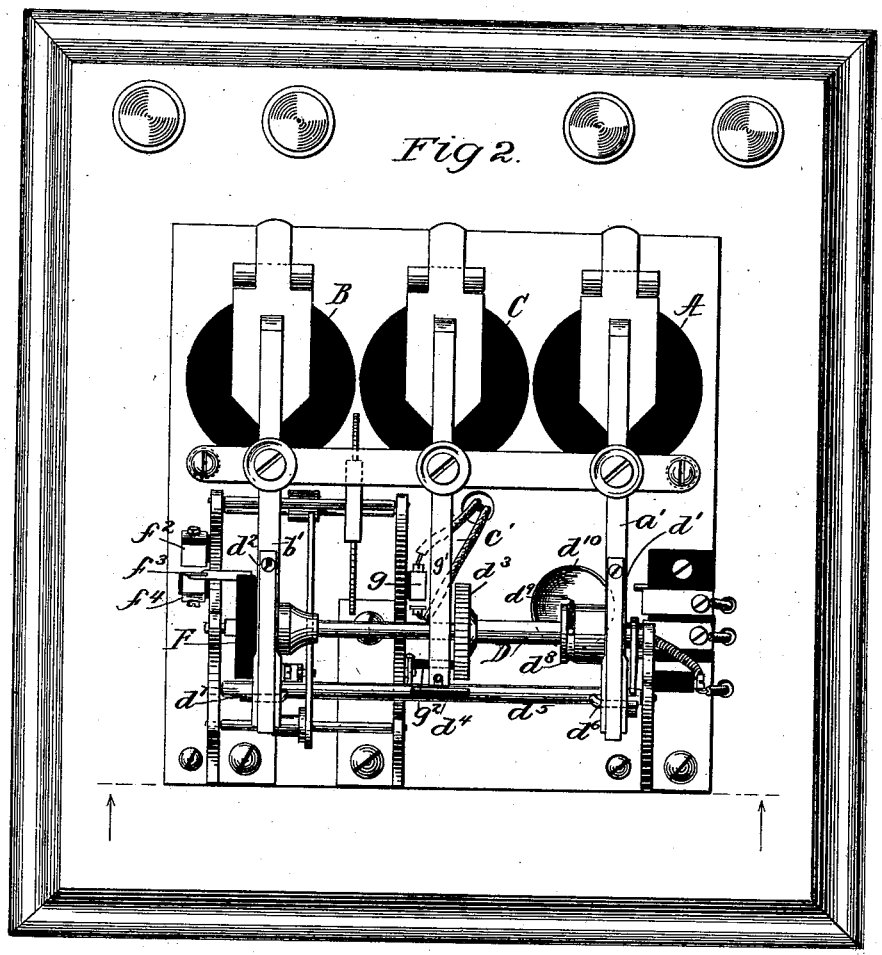
Figure 3:
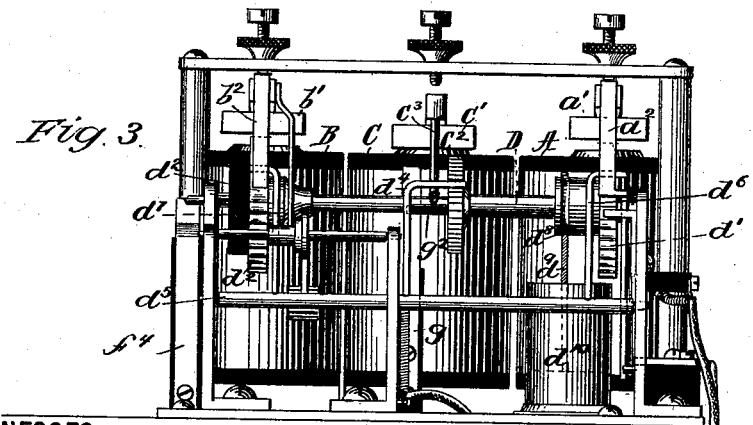
Figure 4:
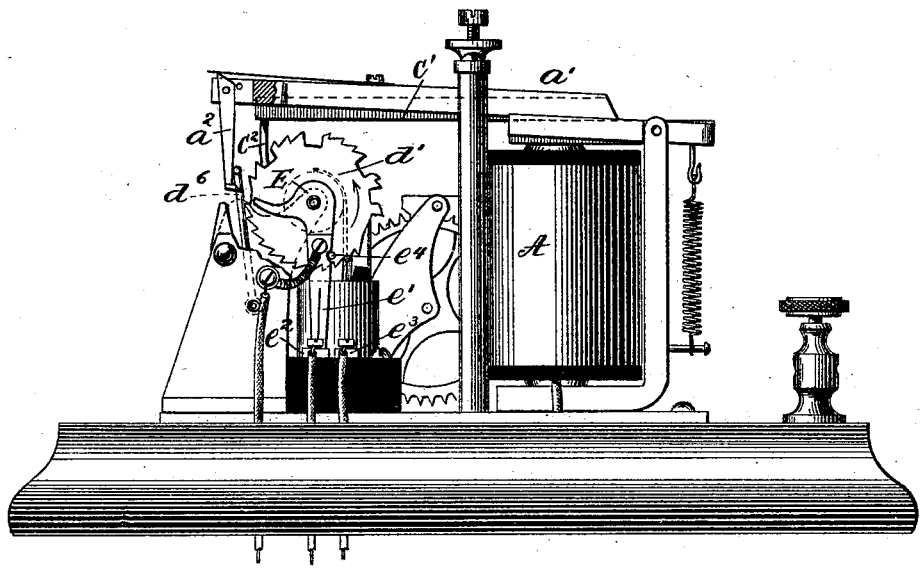
Figure 5:
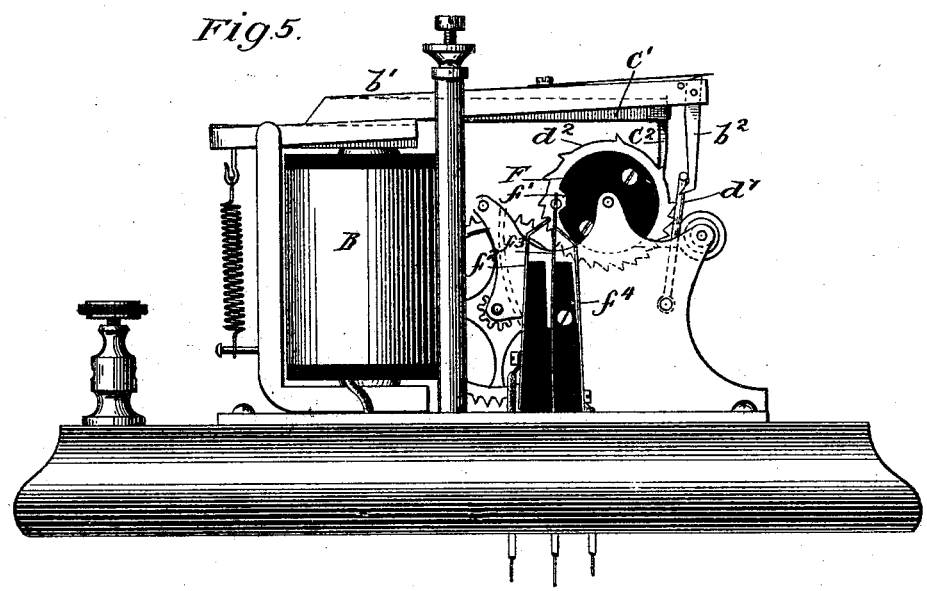
Figure 9:
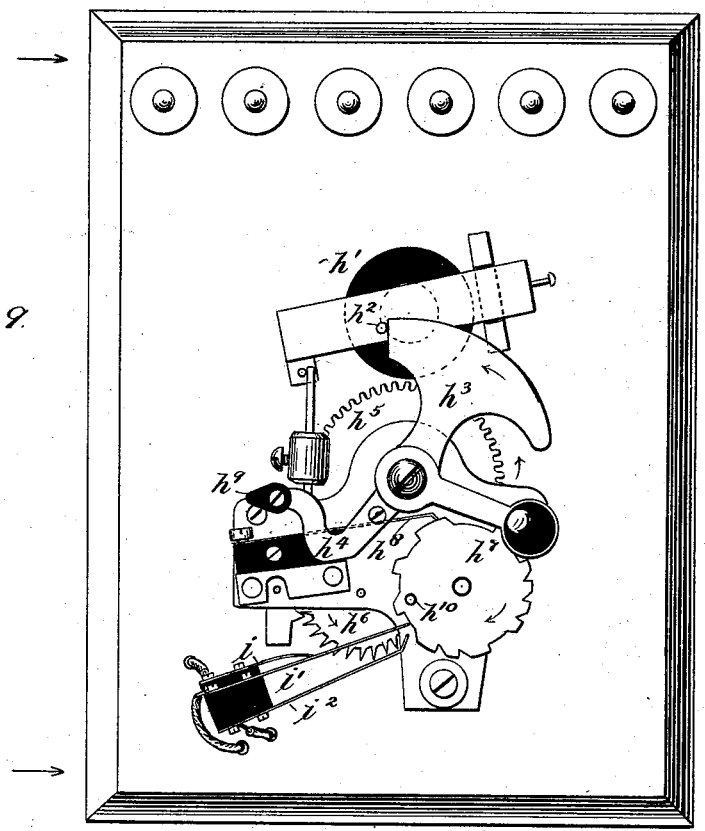
Figure 10:
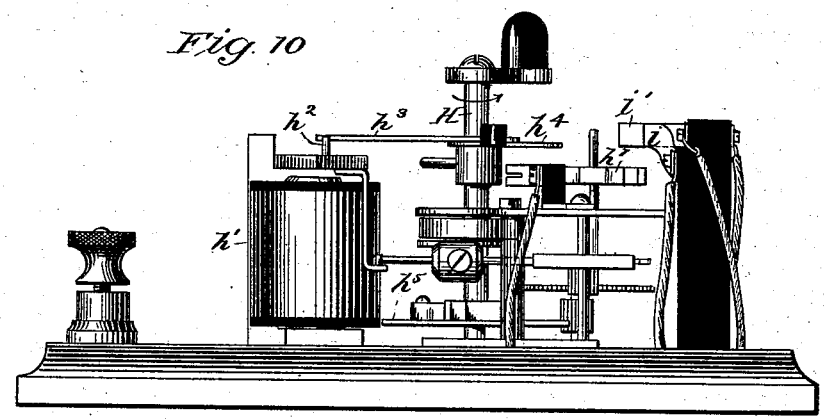

Figure 1, is a plan view of the receiving instrument, sounder, relay, answer-back, transmitting key and signal bell as they are usually connected up in practice. Fig. 2, is a top view of the receiving instrument. Fig. 3, is a front view of the same; Fig. 4, a side view of the receiving instrument with the combination wheel exposed to view; Fig. 5, a view of the other side showing the wheel with its pawl to return the combination wheel past one of the spaces; Fig. 6, a perspective view of shaft with combination and spacing wheels when the instrument is at zero and about to begin with the combination impulses to work out the phase. Fig. 7, is a perspective view of the same with the combination phase completed and the lever for transferring the current shifted to the other contact; Fig. 8, a view of the releasing wheel with its pawl for checking it, with the armature lever of the releasing magnet to throw out the pawls and restore the instrument to zero; Fig. 9, a top view of the answer-back mechanism; Fig. 10, a side view of the same.

Viewing Figs. 2 and 3, illustrating top and front views of the receiving instrument there are shown suitably secured to a proper base, three magnets, marked A, B, and C, each provided with an armature and armature lever mounted in the usual way to be attracted by the magnet and retracted by a spring. The levers are marked respectively $a'$, $b'$, and $c'$; the levers $a'$, and $b'$, have attached to their ends the pivoted spring pawls, $a^2$, $b^2$, while the bar or rod $c$, at the end of lever $c'$, may be rigid. The magnet A, through its armature lever operates the combination wheel or sector; the magnet B operates the spacing wheel or sector, and the office of magnet C operating through its armature lever is to actuate the releasing mechanism which allows the device to be returned to zero; hence it will simplify the description to refer to these magnets as the combination magnet, the spacing magnet and the releasing magnet and their respective armatures or pawls in the same way.

A shaft D suitably journaled, carries three wheels $d'$, $d^2$, $d^3$. The wheel $d'$ is provided with an exact mechanical representation of the fixed or predetermined combination of impulses with which each of the many receiving instruments must be furnished, and each must have its own combination; it is therefore called the combination wheel or sector. The combination selected as an illustration and shown in the drawings, as will more fully appear by reference to Figs. 6 and 7, is 2—3—4—1—1—, or when given by impulses would be 1, 2—1, 2, 3,—1, 2, 3, 4,—1—1. Each of these I have called a member of the combination. Between each of these members the wheel or sector is provided with a deep notch or space, which separates each of the members of the combination from the one next adjoining. The wheel $d^2$, is also provided with teeth so arranged that when the combination is properly worked out, its pawl $b^2$, will turn the shaft and the combination wheel so that one of the spaces of that wheel will pass the end of the pawl $a^2$, and allow the pawl to lodge upon the first tooth of the next member of the combination beyond this space. This wheel $d^2$, I have therefore called the spacing-wheel. On the same shaft and intermediate the combination and spacing-wheels, is placed an ordinary ratchet wheel $d^3$ which operates in conjunction with a spring retaining pawl, $d^4$, whose office is to enter into a ratchet on the wheel $d^3$, at each impulse, and hold the shaft with its wheels preventing it from returning backward. Suitably journaled in the frame is the rock-shaft $d^5$, to which the lower end of pawl $d^4$, is secured so that an outward movement of the pawl $d^4$ would give a corresponding rocking movement to the shaft $d^5$; secured also to this shaft are the arms $d^6$ and $d^7$, whose upper ends are bent so as to project behind the combination and spacing pawls $a^2$, $b^2$. Thus when the arm $d^4$ is impelled outwardly, to rock the shaft $d^5$, these two arms move with it and throw out the pawls $a^2$ and $b^2$ releasing all of the wheels on the shaft so that they are free to be returned to the starting point or zero. This operation is performed by the armature lever $c'$ and its arm $c^2$, which strikes against the bent arm $d^4$ as the lever descends, throwing it out, and releasing the wheels; the magnet C its armature lever $c'$, and arm $c^2$, I call the releasing magnet, releasing lever, &c., respectively as this is the whole office and function of these parts.

Upon the shaft D is placed a drum $d^8$, and a cord $d^9$ is attached thereto, so as to be wound thereon. The other end of this cord is provided with a weight, which descends into a suitable well $d^{10}$ and which acts as a guide; a spring would answer the purpose of the weight; as the wheels are impelled forward the weight is lifted, a force is stored, and when the releasing armature has thrown out the pawls and the shaft is released, the instrument is returned and restored to its starting point.

From the above description it will be seen that when the receiving instrument is at work, the current is through the combination magnet, or the spacing magnet, or the releasing magnet, but not through any two of them at once, that is to say when the combination wheel is operated the current is through the combination magnet; when the spacing wheel is worked the current has left the combination magnet and is through the spacing magnet, and when a false combination is transmitted or when the combination is worked out to the end of its phase, the current is shifted to the releasing magnet to release the wheels and allow the weight to return them to starting point. Now the currents which operate the armature levers of the receiving instrument all start from and end with the armature lever of the relay, and alternate through the front and back stops thereof; that is to say: the combination and releasing magnets are operated by the current from the front stop and the spacing magnet by the current from the back stop; normally the current from the front stop operates the combination wheel until a false impulse is sent out or the combination is worked out to the end of its phase; it is in each of such cases transmitted automatically to the releasing magnet to return the wheels to starting point, and herein are defined the functions of the open cuts between the mechanical members of the combination with which the combination wheel is provided.

Viewing Figs. 6 and 7 there will be seen a suitably pivoted or fulcrumed bell-crank-lever E; for convenience it is pivoted on the end of the shaft D. It is provided with a spring contact plate $e'$. The end of its upper arm lies directly in the path of the combination pawl $a^2$, but while this pawl is performing its duty in turning the combination wheel, it is prevented by the teeth of the wheel from engaging with the end of this lever (see Fig. 6), but when it is opposite one of the open cuts between the members of the combination or at the end of its phase (see Fig. 7) it acts upon this lever and operates it to shift the current to the releasing magnet. Viewing the same figures, it will be seen that the spring plate $e'$ at the other end of the lever E, makes two contacts, $e^2$ and $e^3$, when the current from the front stop of the relay is normal it is through the combination magnet and the bell-crank lever stands as shown in Fig. 6, with its spring on contact $e^2$; when the phase is worked out or a false impulse sent the pawl $a^2$ throws the lever E to contact $e^3$, as shown in Fig. 7, and the current is shifted to the releasing magnet. On the face of the combination wheel is placed a pin $e^4$ which travels with the wheel away from lever E (see Fig. 7); when the wheels are released and fly back to starting point this pin strikes the lever E, shifts it back to contact $e^2$; thus the releasing and returning devices have performed their work and have restored the current from its front relay stop to and through the combination magnet. It has been said that the office of the spacing wheel is to turn the combination wheel from the last tooth of one member of the combination over the space and lodge it on the first tooth of the next member. Viewing Fig. 6 the operation will be readily understood. The wheels are now at the starting point, a properly prepared automatic transmitter may be used or an ordinary telegraph key. If a key be used the operator gives the following impulses from the front relay stop: 1—2; it will be seen now if he gives another the combination has failed and the pawl $a^2$ will operate the lever E and shift the current to the releasing magnet; but instead of this he allows the relay armature lever to go to the back stop, from whence the current is through the spacing magnet. The pawl of that magnet is now resting upon tooth 1, of the spacing wheel; the impulse from the back stop turns the shaft D and combination wheel until its pawl rests upon tooth 1, behind the space; the operator then gives impulses on the front stop, 1,—2,—3, bringing the spacing pawl on tooth 2, of the spacing wheel; an impulse from the back stop lodges the combination pawl on tooth 1, of the next member of the combination; then from the front stop are given impulses 1,—2,—3,—4; then one from the back stop, and one from the front stop.

The apparatus may be connected up in several ways but as shown in the figures, viewing diagram Fig. 1, the circuit may be described as follows: The main line entering at the top right hand as shown in Fig. 1, and following the direction of the arrow, runs to binding post 1 of the relay, through the coils of the relay magnets and out at binding post 2, to post 3 of the key, and out at post 4, to binding post 5 of the answer-back, thence to the answer-back wheel $h^7$, and through its brush $h^8$, to binding post 6 of answer-back, and thence out to line. The local circuits are as follows: Starting from one pole of local battery and running to the left, enters at armature lever or relay, and thence alternately to front and back contacts of the relay. From the front contact it runs to binding post 9 of the selecting instrument, thence to contact $g$, thence to contact spring $f^3$, to plate $e^2$, thence through spring $e'$, to and through the coils of magnet A to binding post 10 on selector; thence to binding post 7, and through magnets of sounder to binding post 8, thence to binding post 11, of answer-back, thence to tap, to one side of answer-back magnets, thence to spring $i$, through $i'$, to binding post 12, thence to the other pole of battery, thus completing the circuit through the front stop of relay, which operates the combination magnet of selecting instrument and the sounder. The circuit from back contact of relay is as follows: To binding post 13, thence to binding post 14 of selecting instrument, thence to magnet B, through one side of magnets C and A, through binding post 10, to common return, and through the same path from binding post 10, as that already described to the other pole of battery. When the combination is completed on selecting instrument and the lever E and its spring $e'$ are thrown from contact $e^2$ to contact $e^3$, the releasing magnet is thrown into circuit through lever E, and from thence through loop to magnet A, and binding post 10, and through common return from post 10 to the other pole of battery. When the answer-back mechanism has closed the spring $i'$ against $i^2$, the bell is brought into circuit and the current runs from one pole of battery through bell magnet, to binding post 15 of answer back, thence to springs $i^2$, $i'$, to binding post 12, and thence to the other pole of battery. All the circuits pass through the sounder except the bell circuit, and as these circuits proceed from the front and back contacts of relay, the current through the combination magnet proceeds from the front contact and that of the spacing magnet from the back contact. When the phase of the combination has thus been worked out, the combination pawl contacts at once with the arm of lever E throwing the current to the releasing magnet and at the same time the current is transferred to the answer-back magnet, but the action of the releasing magnet is to release the weight, and the weight turning the combination wheel, its pin $e^4$, would shift the lever E to contact $e^2$, but in order to keep the current in the releasing magnet I have an arrangement which I will now describe. Viewing Fig. 5, there is placed upon the shaft D an insulating wheel F, provided with the notch $f'$, and suitably supported on the frame and insulated from each other are the contacts $f^2, f^3, f^4$; $f^3$ the middle one, is a spring, inclining naturally to the contact $f^4$; during the working of the wheels on shaft D, a roller on the upper part of this spring runs around the surface of the insulating wheel F, and keeps the spring $f^3$ against the contact $f^2$; when the combination is completed this roller drops into the slot $f'$ and the spring $f^3$, contacting with $f^4$, keeps the current through the releasing magnet and prevents the pawls $a^2$ and $b^2$ from operating the wheels until the current has passed to the answer-back magnet, and from thence back to the receiving instrument, when the first impulse from the back stop of the relay will again throw the roller upon the periphery of the insulating wheel and restore the operating pawls to their respective places.

The following mechanism is used to shift the current to the answer-back magnet: Viewing Figs. 1 and 2, $g$, is a contact point and $g'$ a spring whose normal position is away from the contact point; on the wheel $d^3$ I have placed a pin $g^2$ and have located it so that it strikes the spring and forces it against the contact point when the instrument has completed its phase. This shifts the current to the answer-back momentarily, long enough to start it off, as I will explain. Viewing Figs. 9 and 10, which illustrates the mechanism of the answer-back, a shaft as H is suitably mounted and journaled in a frame; a magnet $h'$ is provided with an appropriate armature lever, from which projects the pin $h^2$; on the shaft H is a lever provided with the arms $h^3$, $h^4$; the arm $h^3$ is broad and flat so that it will travel some distance over the pin $h^2$ and hold it down while it travels, the pin is normally in contact with this arm and holds it in a position of rest until released and the arm is revolved by a clockwork of which the wheels $h^5$ and $h^6$ are shown and need not be further described; the train of this clock work is also connected with the wheel $h^7$; upon this wheel is cut the answer-back message and as it turns transmits this message to the operator at the station through the spring contact $h^8$ which bears upon the edge of the wheel and transmits the combination to the station; when the current has drawn down the armature lever of the magnet $h'$ and with it the pin $h^2$ the arm $h^3$ begins to revolve in the direction of the arrow, and although as already described the current is put momentarily through this magnet yet the arm $h^3$ when once released continues to revolve until stopped at a point before the pin passes the end of the broad arm $h^3$. Suitably supported on the frame of the answer-back and insulated from each other are the three contacts $i$, $i'$, $i^2$; the middle one $i'$, normally rests against the contact $i$; upon the end of the arm $h^4$, is an insulating point $h^9$, which revolves with the arm when released and striking the contact $i'$, forces it away from $i$, and against $i^2$; this does not occur, however, until the wheel $h^7$, has revolved and transmitted its message back to the station; on the wheel $h^7$ is a pin $h^{10}$, and when the insulating point $h^9$ has transferred the contact $i'$ from $i$ to $i^2$ a part of the arm $h^4$ comes in contact with this pin and holds it in that position with the current transferred to the bell; in which position it will remain ringing the bell until the signal is stopped by the operator who turns the shaft H backward until the arm $h^3$ passes the pin $h^2$, which springs up and catches the arm and at the same time the contact $i'$ returns to contact $i$, and transfers the current back to the receiving instrument the first impulse through which, places the roller on the end of contact $f^3$ on the edge of the insulating wheel F, taking the current out of the releasing magnet and preparing the receiving instrument to receive its combination from the transmitter when required.

The train of gearing shown in Figs. 2, 4 and 5, is intended to illustrate an escapement device to retard the operation of the spacing magnet; the construction of such escapements is well known and need not be described; a dash pot would answer the same purpose and for many purposes the instrument may be operated without any retarding device.

What I claim, and desire to secure by Letters Patent, is—

1. In an electric selecting device, a movable wheel, bar or sector, provided with a mechanical representation of a fixed combination of electrical impulses, consisting of a series of members, each member representing one or more of the electrical impulses, and separated from the adjoining member of the combination; in combination with an electro-magnet and its armature lever acting directly on the wheel and responding to the transmitted impulses to positively impel the wheel or sector to work out the combination, and means for transmitting the combination impulses.

2. In an electric selecting device, a movable wheel, bar or sector, provided with a mechanical representation of a fixed combination of electrical impulses, consisting of members separated by a space or spaces, in combination with a movable wheel, bar or sector, provided with a mechanical representation of the spaces between the members of the combination on the combination sector, in combination with two electro-magnets provided with their respective armature levers and responding to the transmitted impulses, one to impel the combination sector, and the other to impel the spacing sector, and means for transmitting the electrical impulses to each of said magnets.

3. In an electric selecting device, two wheels or sectors mounted upon the same shaft one provided with a mechanical representation of a fixed combination of electrical impulses and the other provided with a mechanical representation of the spaces between the members of the combination wheel, each of said wheels or sectors operated by the armature lever of an electro-magnet, one of them by impulses transmitted through the front stop of the relay and the other by impulses transmitted through the back stop of said relay.

4. In an electric selecting device, a wheel or sector provided with a mechanical representation of a fixed combination of electrical impulses, separated by a deep cut between the members of the combination, and operated by a pawl and armature lever of an electro-magnet acting directly on the wheel and responding to electrical impulses transmitted through the magnet, in combination with means for checking the wheel or sector at each impulse, an electro-magnet and its armature lever for releasing the checking mechanism, and means operated by the armature lever of the combition magnet for shifting the current to the releasing magnet to restore the wheels or sectors to starting point.

5. In an electric selecting device, a combination wheel, a spacing wheel and a check wheel each mounted upon the same shaft, the combination and spacing wheels operated by electrical impulses transmitted through their respective magnets and the checking mechanism released by an impulse transmitted through the releasing magnet, in combination with means operated by the pawl of the combination magnet to shift the current to the releasing magnet when a false impulse is transmitted or when the combination phase is completed, and means for shifting the current back to the operating magnets actuated by the return of the wheels to starting point.

6. In an electric selecting device, a receiving instrument, an answer-back instrument and a signaling instrument each provided with its respective electro-magnet, the receiving instrument provided with a movable wheel or sector responding to its fixed combination of electrical impulses transmitted through its operating magnet, in combination with means operated by the impelled wheel or sector to shift the current to the answer back magnet, means operated by the answer back magnet to shift the current to the signaling magnet and means operated by restoring the answer-back mechanism to its starting point to shift the current from the signaling magnet and restore it to the receiving instrument.

Signed at New York, in the county of New York and State of New York, this 11th day of November, A. D. 1891.

SAMUEL S. BOGART.

Witnesses:
WM. C. LANE,
WM. C. COX.